US012774856B2

(12) United States Patent
Alahyari et al.

(10) Patent No.: US 12,774,856 B2
(45) Date of Patent: Oct. 27, 2026

(54) ADAPTIVE OSCILLATING HEAT PIPE

(71) Applicant: Raytheon Company, Tewksbury, MA (US)

(72) Inventors: Abbas A. Alahyari, Glastonbury, CT (US); Miad Yazdani, South Windsor, CT (US)

(73) Assignee: RAYTHEON COMPANY, Waltham, MA (US)

(*) Notice: Subject to any disclaimer, the term of this patent is extended or adjusted under 35 U.S.C. 154(b) by 207 days.

(21) Appl. No.: 18/412,803

(22) Filed: Jan. 15, 2024

(65) Prior Publication Data

US 2025/0230988 A1 Jul. 17, 2025

(51) Int. Cl.
*F28D 15/02* (2006.01)
*F03G 7/06* (2006.01)
*F28D 15/06* (2006.01)

(52) U.S. Cl.
CPC ....... *F28D 15/0266* (2013.01); *F03G 7/0614* (2021.08); *F28D 15/06* (2013.01)

(58) Field of Classification Search
CPC .. F28D 15/0266; F28D 15/0233; F28D 15/06; F03G 7/0614; F28F 2013/008; F28F 13/08; F28F 2255/04
See application file for complete search history.

(56) References Cited

U.S. PATENT DOCUMENTS 5,309,717 A * 5/1994 Minch .................. F03G 7/0614 165/47
6,460,612 B1 * 10/2002 Sehmbey ............. F28D 15/046 174/15.2
7,288,326 B2 * 10/2007 Elzey ................. F03G 7/06147 428/179
11,186,387 B2 11/2021 Cognata
11,415,370 B2 * 8/2022 Joshi ......................... F28B 1/02
(Continued)

FOREIGN PATENT DOCUMENTS

EP 3465051 B1 6/2021
JP 2017041830 A 2/2017
(Continued)

OTHER PUBLICATIONS

Wang, B., et al; "Design and test of smart heat exchanger based on shape memory alloys", Applied Thermal Engineering, vol. 221, (2023).

*Primary Examiner* — Travis Ruby
(74) *Attorney, Agent, or Firm* — CANTOR COLBURN LLP

(57) ABSTRACT

An adaptable oscillating heat pipe system comprises an oscillating closed loop heat pipe (OHP) configured for movement of a fluid in an internal passage in the closed loop to transfer heat from a first portion of the closed loop to a second portion and a shape memory alloy component arranged at a portion of the internal passage. The shape memory alloy component is configured to oscillate between a first shape and a second shape. In the first shape the shape memory alloy component causes the portion of the internal passage to have a first fluid flow profile and in the second shape the shape memory alloy component causes the portion of the internal passage to have a different second fluid flow profile. The oscillation of the shape memory alloy component is a function of temperature at the shape memory alloy component.

16 Claims, 4 Drawing Sheets

(56) References Cited

U.S. PATENT DOCUMENTS

| | | | | |
|---|---|---|---|---|
| 11,459,127 | B2 | 10/2022 | Duong | |
| 2008/0196401 | A1* | 8/2008 | Muramatsu | F28D 15/0266 60/320 |
| 2009/0223648 | A1* | 9/2009 | Martin | F28F 1/40 165/86 |
| 2013/0255739 | A1 | 10/2013 | Kossakovski | |
| 2014/0157769 | A1* | 6/2014 | Daly | F03G 7/0614 60/527 |
| 2016/0209132 | A1* | 7/2016 | Mironets | F28F 3/022 |
| 2018/0017345 | A1 | 1/2018 | Poltorak | |
| 2019/0315500 | A1 | 10/2019 | Duong | |
| 2019/0315501 | A1 | 10/2019 | Duong | |
| 2020/0002026 | A1 | 1/2020 | Duong | |
| 2022/0073217 | A1 | 3/2022 | Iverson | |
| 2022/0196350 | A1 | 6/2022 | Alahyari | |
| 2023/0031618 | A1* | 2/2023 | Liu | F28D 15/0233 |
| 2023/0299312 | A1 | 9/2023 | Hennersperger | |
| 2023/0352358 | A1 | 11/2023 | Alexander | |

FOREIGN PATENT DOCUMENTS

| | | | |
|---|---|---|---|
| WO | 2019204322 | A1 | 10/2019 |
| WO | 2019204463 | A1 | 10/2019 |
| WO | 2020214381 | A1 | 10/2020 |

* cited by examiner

ADAPTIVE OSCILLATING HEAT PIPE

FIELD OF DISCLOSURE

The disclosure relates to oscillating heat pipe systems.

DESCRIPTION OF RELATED ART

Oscillating heat pipe systems (OHP) are two-phase passive heat spreaders that transport the heat from a heat source to a heat sink through oscillatory/circulatory motion of liquid slugs and vapor plugs in a loop. As heat is applied to a first portion of the pipe, the liquid begins to evaporate which causes an increase of vapor pressure inside the pipe causing the bubbles in the first portion to grow and push the liquid towards the heat sink. As the heat sink absorbs the heat from the fluid and cools the fluid, the vapor pressure reduces in a second portion which increases a pressure difference between the first portion and the second portion and results in the oscillating motion between the heat source and the heat sink.

SUMMARY

However, traditional oscillating heat pipe systems are often subject to certain operational constraints. In contrast to conventional heat exchangers that can actively adjust a flow in the pipe via a pump, oscillating heat pipe systems are passive systems that just rely on the pressure difference between different portions of the pipe to move the fluid, oscillating heat pump systems are specifically optimized for certain operating conditions to make sure that the oscillating heat pump will operate. However, the optimized designs for one operating condition may be non-optimal at off-design or different operating conditions. For example, an oscillating heat pipe system with a large internal passage does not function at a low heat load, while an oscillating heat pipe system with a narrow internal passage does not function at a high heat load. Because general electronic components can have a wide operating temperature range, 50° C. to 150° C., being able to adjust the design provides variable capacity depending on heat load or operating environment compared to conventional fixed design oscillating heat pipe systems.

An adjustable oscillating heat pipe system includes one or more components to control a fluid flow profile of one or more sections of the interior passage of the oscillating heat pipe system. In an embodiment, the component comprises a shape memory alloy component that passively oscillates between a first shape and a second shape based on a temperature at the shape memory alloy component. In the first shape, the shape memory alloy component causes the internal passage to have a first fluid flow profile and in the second shape, the shape memory alloy component causes the internal passage to have a different second fluid flow profile. By adjusting the fluid flow profile of the internal passage, the adjustable oscillating heat pipe system described herein can adapt to different heat loads in the system while remaining optimal as conditions change.

According to an aspect of the disclosure, an adaptable oscillating heat pipe system comprises an oscillating closed loop heat pipe (OHP) configured for movement of a fluid in an internal passage in the closed loop to transfer heat from a first portion of the closed loop to a second portion; and a shape memory alloy component arranged at a portion of the internal passage, wherein the shape memory alloy component is configured to oscillate between a first shape and a second shape, wherein in the first shape the shape memory alloy component causes the portion of the internal passage to have a first fluid flow profile, wherein in the second shape the shape memory alloy component causes the portion of the internal passage to have a second fluid flow profile, wherein oscillation of the shape memory alloy component is a function of temperature at the shape memory alloy component.

Exemplary embodiments may include one or more of the following additional features, separately or in any combination.

According to an embodiment of any paragraph(s) of this summary, wherein the shape memory alloy component comprises a sleeve located in an interior of the portion of the OHP.

According to an embodiment of any paragraph(s) of this summary, wherein the OHP is located inside a panel, wherein the shape memory alloy component is in a portion of the panel adjacent a wall of the OHP at the portion of the OHP, wherein the wall of the OHP at the portion of the OHP is flexible.

According to an embodiment of any paragraph(s) of this summary, wherein the second fluid flow profile converges from a first end of the portion to a second end of the portion.

According to an embodiment of any paragraph(s) of this summary, wherein the second fluid flow profile is converging in a first section of the portion of the internal passage of the OHP and diverging in a second section of the portion of the internal passage of the OHP.

According to an embodiment of any paragraph(s) of this summary, wherein the internal passage has a first uniform cross-sectional area in the first fluid flow profile and a second uniform cross-sectional area in the second fluid flow profile.

According to an embodiment of any paragraph(s) of this summary, wherein the first uniform cross-sectional area is larger than the second uniform cross-sectional area.

According to an embodiment of any paragraph(s) of this summary, wherein the second fluid flow profile includes a plurality of protrusions that extend inwardly into the internal passage of the OHP.

According to an embodiment of any paragraph(s) of this summary, further comprising a second shape memory alloy component arranged at a second portion of the internal passage, wherein the second shape memory alloy component is configured to oscillate between a third shape and a fourth shape, wherein in the third shape the second shape memory alloy component causes the second portion of the internal passage to have a third fluid flow profile, wherein in the fourth shape the second shape memory alloy component causes the second portion of the internal passage to have a fourth fluid flow profile, wherein oscillation of the second shape memory alloy component is a function of temperature at the second shape memory alloy component.

According to an embodiment of any paragraph(s) of this summary, wherein the second fluid flow profile and the fourth fluid flow profile are different.

According to an embodiment of any paragraph(s) of this summary, wherein the shape memory alloy component and the second shape memory alloy component are similar.

According to an embodiment of any paragraph(s) of this summary, wherein the shape memory alloy component is configured to line a section of an internal wall of the portion of the internal passage.

According to another aspect of the disclosure, an adaptable oscillating heat pipe system comprises a heat source; a heat sink configured to absorb heat; an oscillating closed loop heat pipe with a first portion of the heat pipe arranged adjacent the heat source and a second portion of the heat pipe arranged adjacent the heat sink, wherein the heat pipe configured for movement of a fluid in an internal passage in the closed loop to transfer heat from the first portion to the second portion; and a shape memory alloy component arranged at a section of the internal passage, wherein the shape memory alloy component is configured to oscillate between a first shape and a second shape, wherein in the first shape the shape memory alloy component causes the section of the internal passage to have a first fluid flow profile, wherein in the second shape the shape memory alloy component causes the section of the internal passage to have a second fluid flow profile, wherein oscillation of the shape memory alloy component is a function of temperature at the shape memory alloy component.

Exemplary embodiments may include one or more of the following additional features, separately or in any combination.

According to an embodiment of any paragraph(s) of this summary, wherein the section of the internal passage comprises at least one of the entire first portion of the heat pipe or the entire second portion of the heat pipe.

According to an embodiment of any paragraph(s) of this summary, further comprising: a second heat source, wherein the heat pipe has a third portion arranged adjacent the second heat source; and a second shape memory alloy component arranged at a second section of the internal passage adjacent between the second heat source and the heat sink, wherein the second shape memory alloy component is configured to oscillate between a third shape and a fourth shape, wherein in the third shape the second shape memory alloy component causes the second section of the internal passage to have a third fluid flow profile, wherein in the fourth shape the second shape memory alloy component causes the second section of the internal passage to have a fourth fluid flow profile, wherein oscillation of the second shape memory alloy component is a function of temperature at the second shape memory alloy component.

According to an embodiment of any paragraph(s) of this summary, wherein the shape memory alloy component and the second shape memory alloy component are different.

According to an embodiment of any paragraph(s) of this summary, further comprising: a second heat sink configured to absorb heat, wherein the heat pipe has a third portion arranged adjacent the second heat sink; and a second shape memory alloy component arranged at a second section of the internal passage extending between the heat source and the second heat sink, wherein the second shape memory alloy component is configured to oscillate between a third shape and a fourth shape, wherein in the third shape the second shape memory alloy component causes the second section of the internal passage to have a third fluid flow profile, wherein in the fourth shape the second shape memory alloy component causes the second section of the internal passage to have a fourth fluid flow profile, wherein oscillation of the second shape memory alloy component is a function of temperature second shape memory alloy component.

According to a further aspect of the disclosure, a method of manufacturing an adaptable oscillating heat pipe system comprises arranging a shape memory alloy component at a section of an internal passage of the oscillating heat pipe, wherein the shape memory alloy component is configured to oscillate between a first shape and a second shape, wherein the shape memory alloy component is arranged such that in the first shape the shape memory alloy component causes the section of the internal passage to have a first fluid flow profile and in the second shape the shape memory alloy component causes the section of the internal passage to have a second fluid flow profile.

Exemplary embodiments may include one or more of the following additional features, separately or in any combination.

According to an embodiment of any paragraph(s) of this summary, wherein arranging the shape memory alloy component includes securing the shape memory alloy component on an internal surface of the oscillating heat pipe.

According to an embodiment of any paragraph(s) of this summary, wherein arranging the shape memory alloy component includes positioning the shape memory alloy component adjacent an external surface of the oscillating heat pipe.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

Figure 1:
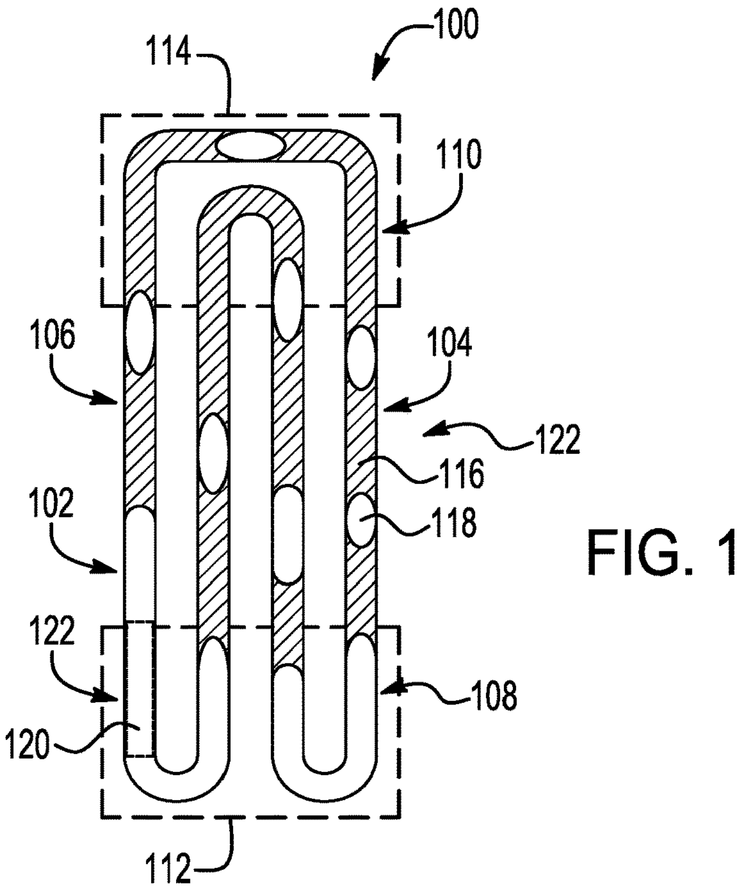
FIG. 1 is a view of an adjustable oscillating heat pipe system with a shape memory alloy component according to an embodiment of the disclosure.

Aspects of the present application pertain to an adaptable oscillating heat pipe system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term “or” is intended to mean an inclusive “or” rather than an exclusive “or.” That is, unless specified otherwise, or clear from the context, the phrase “X employs A or B” is intended to mean any of the natural inclusive permutations. That is, the phrase “X employs A or B” is satisfied by any of the following instances: X employs A; X employs B; or X employs both A and B. In addition, the articles “a” and “an” as used in this application and the appended claims should generally be construed to mean “one or more” unless specified otherwise or clear from the context to be directed to a singular form. Additionally, as used herein, the term “exemplary” is intended to mean serving as an illustration or example of something and is not intended to indicate a preference.

Disclosed is an adaptable oscillating heat pipe system that includes one or more shape memory alloy components that oscillates between shapes to oscillate fluid flow profiles of an internal passage of the pipe between a first profile and a second profile. In the first profile, the internal passage has a first fluid flow profile while in the second profile, the internal passage has a second fluid flow profile different from the first fluid flow profile. The oscillation of the shape memory alloy components occurs based on temperature of the shape memory alloy. By oscillating the shape of the shape memory alloy components to alter the fluid flow profile in the internal passage, the heat pipe system described herein can account for different heat loads.

Turning now to FIG. 1, an adjustable oscillating heat pipe system (OHP) 100 is illustrated that includes a pipe 102 with an internal passage 104 shaped to permit movement of fluid 106 within the pipe 102. The fluid 106 can be liquid, gas, and/or the like. Exemplary working fluid 106 can include, water, acetone, an alcohol (such as ethanol, methanol, or the like), a mixture of different fluids, and/or the like. As noted above, a heat pipe is a heat-transfer device that uses a phase transition to transfer heat between two interfaces. In the illustrated embodiment, a first portion 108 of the pipe 102 is arranged adjacent a first device that generates heat (e.g., heat source 112) and a second portion 110 is adjacent a second device that absorbs heat (e.g., heat sink 114).

OHP 100 is configured such that surface tension force between the pipe 102 and the fluid 106, e.g., at the surface of the internal passage 104, causes the formation of liquid slugs 116 that are interspersed with vapor bubbles 118. As heat is applied to the first portion 108 of the pipe 102, the fluid 106 begins to evaporate which causes an increase of vapor pressure inside the pipe 102 which causes the bubbles 118 in the first portion 108 to grow and push the liquid towards the heat sink 114. As the heat sink 114 absorbs the heat from the fluid 106 and cools the fluid 106, the vapor pressure reduces in the second portion 110 which increases a pressure difference between the first portion 108 and the second portion 110.

The pipe 102 can take any suitable shape, size, and/or configuration for selectively controlling fluid flow therein. For example, the pipe 102 may include one or more curved sections resulting in a serpentine path for flow of the fluid 106, as illustrated in FIG. 1. This can result in the first portion 108 and/or the second portion 110 of the pipe 102 comprising multiple separate parts, such as multiple curved portions in FIG. 1. In another example, the pipe 102 may have an open end where fluid is added or removed as needed.

In a further example, the pipe 102 is a closed loop such that the fluid continuously travels in a loop. Because of the closed loop nature of the pipe 102, a driving force that drives the slugs 116 and the bubbles 118 from the first portion 108 toward the second portion 110, because of the growth of the bubbles 118, causes a corresponding restoring force that drives the slugs 116 and bubbles 118 from the second portion 110 toward the first portion 108. The driving force and corresponding restoring force leads to oscillation of the slugs 116 and bubbles 118 in an axial direction and frequency and amplitude of the oscillation can be dependent on shear flow and mass fraction of the fluid 106 in the pipe 102.

As noted above, since closed-loop OHPs are passive systems that rely on the oscillation of the slugs 116 and bubbles 118, each OHP is specifically optimized for certain operating conditions to make sure that the OHP will operate as required. For instance, the optimized design can include the size of the internal passage 104, the number of loops, the shape of the pipe 102, and/or the like. However, the optimized designs for one operating condition may be non-optimal at off-design or different operating conditions. For example, an OHP with a large internal passage 104 does not function at a low heat load, while an OHP with a narrow internal passage 104 does not function at a high heat load. Because general electronic components can have a wide operating temperature range, 50° C. to 150° C., being able to adjust the design provides variable capacity depending on heat load or operating environment compared to conventional fixed design OHPs.

To that end, the OHP 100 further includes a component configured to alter a design of one or more parts of the OHP 100 based on different operating conditions. The component can be further configured to oscillate the OHP 100 between different designs for different operating conditions such that the same OHP 100 can be used for multiple operating conditions. Any suitable component can be used that oscillates a design of one or more parts of the OHP 100 based on the current operating condition. In the embodiments described herein, the component is a shape memory alloy (SMA) component 120 configured to change a shape of one or more sections of the internal passage 104. SMA components are configured oscillate between two different independent shapes in response to light and/or heat. By using the SMA component 120, the described OHP 100 can have a first fluid flow profile for a first operating condition (e.g., a first heat load) and different second fluid flow profile for a second operating condition (e.g., a second heat load). Any suitable shape memory alloy material may be used, such as copper-aluminum-nickel, nickel titanium (nitinol), and/or alloying zinc, copper, gold, and/or iron. Moreover, different shape memory alloy materials may be used depending on the operating conditions the SMA component 120 is oscillating between.

The SMA component 120 can be configured to adjust any suitable part and/or parts of the OHP 100. In embodiments described herein, the SMA component 120 is configured to alter a fluid flow profile of the internal passage 104. In another embodiment, the SMA component 120 could be configured to adjust the shape of the pipe 102 by bending the pipe 102 to add more curved sections and/or straighten the pipe 102 to remove curved sections.

The SMA component 120 can be located at any suitable position with respect to the pipe 102 and/or internal passage 104. In the illustrated embodiment, the SMA component 120 is located in the internal passage 104 within a section 122 of the pipe 102. Accordingly, the illustrated SMA component 120 can be configured to define the fluid flow profile of the internal passage 104 at the section 122 of the pipe 102. In one embodiment, the SMA component 120 is a sleeve inserted into the pipe 102 with one or more portions of the sleeve secured to the inner wall of the pipe 102. In another embodiment, the SMA component 120 comprises a thin wall of SMA material attached to the inner wall of the pipe 102 to line the wall of the internal passage 104.

The SMA component 120 can be configured to adjust any suitable amount of the internal passage 104. In one embodiment, the SMA component 120 can be configured to adjust the entire internal passage 104. In another embodiment, the SMA component 120 can be configured to adjust a portion of the internal passage 104. For instance, the SMA component 120 can be configured to adjust the portion of the internal passage 104 at the heat source 112 (e.g., the first portion 108), the portion of the internal passage 104 at the heat sink 114 (e.g., the second portion 110), and/or the portion(s) of internal passage 104 that extend between the heat source 112 and the heat sink 114. In the illustrated embodiment, the SMA component 120 is located in a portion of the internal passage at the heat source 112.

As discussed above, the SMA component 120 can be configured to change a cross-sectional profile of the internal passage 104 to in turn change a flow profile of fluid within the section of the internal passage 104. In the embodiments illustrated in FIGS. 2-6, the SMA component 120 is formed on the surface of the internal passage 104. However, as described below, the SMA component 120 may be formed on the exterior of the pipe 102 and the change in shape causes the wall of the pipe 102 to flex.

Figure 2:
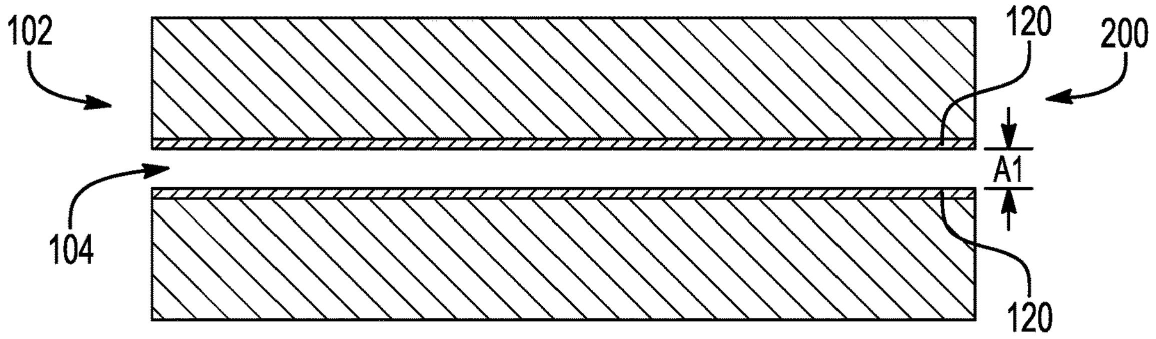
FIG. 2 is a view of a shape memory alloy component in one shape according to an embodiment of the disclosure.
Figure 3:
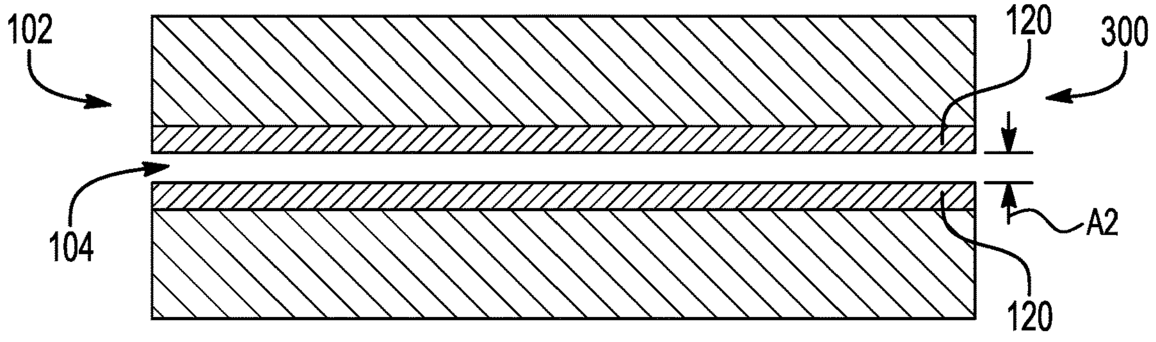
FIG. 3 is a view of the shape memory alloy component of FIG. 2 in another shape according to an embodiment of the disclosure.

Turning now to FIGS. 2 and 3, illustrated are different fluid flow profiles that correspond to different shapes of the SMA component 120. When the SMA component 120 is in a first shape 200, illustrated in FIG. 2, the internal passage 104 is a straight channel with a uniform cross-sectional area A1 along the length of the channel. Conversely, when the SMA component 120 is in a second shape 300, illustrated in FIG. 3, the internal passage 104 is a straight channel with a second uniform cross-sectional area A2 along a length of the channel.

As seen by comparing FIGS. 2 and 3, the cross-sectional area A1 is larger than the cross-sectional area A2. By having a larger internal passage 104 when the SMA component 120 is in the first shape 200, the OHP 100 can operate appropriately when there is a high heat load on the OHP 100. Moreover, by having a smaller internal passage 104 when the SMA component 120 is in the second shape 300, the same OHP 100 can be used when there are lower heat loads on the OHP 100. Furthermore, as noted above, the SMA component 120 can oscillate between the first shape 200 and the second shape 300 based on the current heat load on the OHP 100 which allows the OHP 100 to adapt to different operating conditions.

Figure 4:
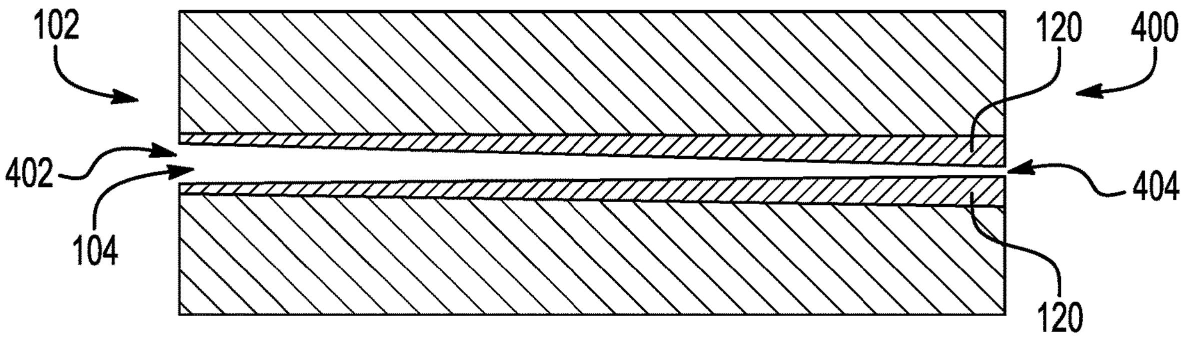
FIG. 4 is a view of the shape memory alloy component of FIG. 2 in a further shape according to an embodiment of the disclosure.
Figure 5:
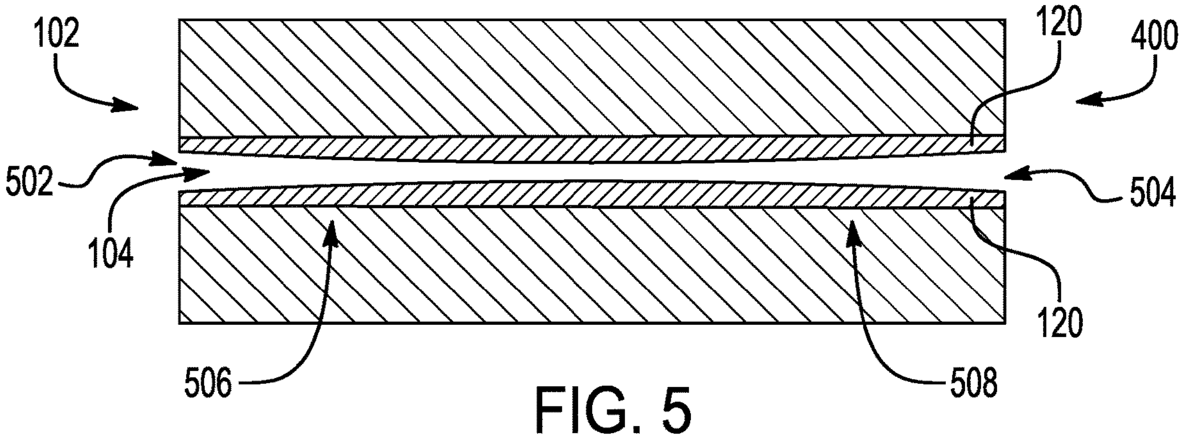
FIG. 5 is a view of the shape memory alloy component of FIG. 2 in yet another shape according to an embodiment of the disclosure.
Figure 6:
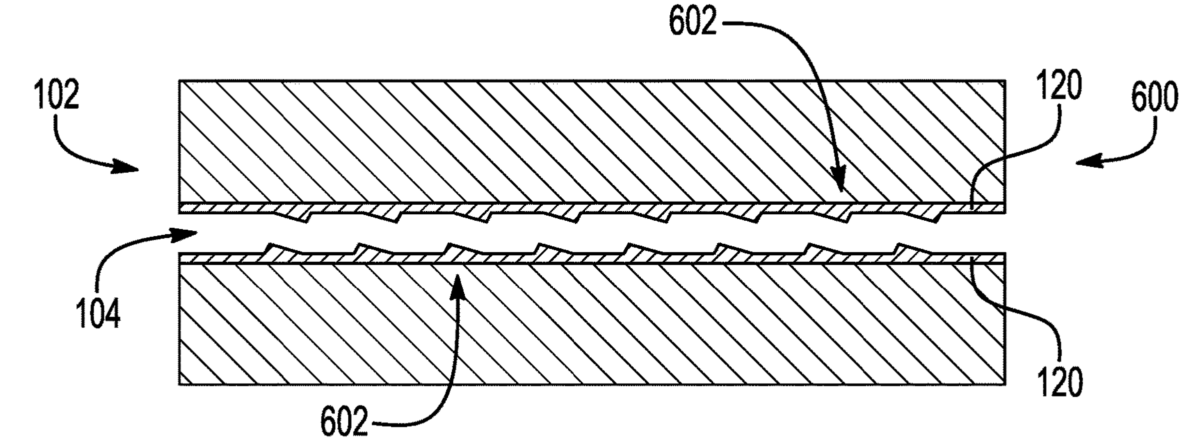
FIG. 6 is a view of the shape memory alloy component of FIG. 2 in a yet further shape according to an embodiment of the disclosure.

Other shapes of the internal passage 104 when the SMA component 120 is in the first shape 200 and/or second shape 300 are also conceivable. Turning to FIGS. 4-6, illustrated are exemplary embodiments of the internal passage 104 as non-uniform channels. The illustrated channels in FIGS. 4-6 can correspond to when the SMA component 120 is in the first shape and/or the second shape. In the embodiment illustrated in FIG. 4, the SMA component 120 is in a shape 400 that causes the internal passage 104 to have a converging shape between a first end 402 and a second end 404 such that the cross-sectional area of the internal passage 104 decreases as the channel extends from the first end 402 to the second end 404. The decrease can be linear, as illustrated, and/or other configurations are imagined.

Turning now to FIG. 5, illustrated is an embodiment where the SMA component 120 is in a shape 500 that causes the internal passage 104 to have a converging/diverging shape between a first end 502 and a second end 504. More particularly, a first portion 506 of the internal passage 104 is converging while a second portion 508 of the internal passage 104 is diverging. The converging first portion 506 and the diverging second portion 508 can be arranged in any suitable configuration. In the illustrated embodiment, the first portion 506 and the second portion 508 are arranged such that the end of the converging first portion 506 is connected to the beginning of the diverging second portion 508.

In another embodiment, illustrated in FIG. 6, the SMA component 120 is in a shape 600 that results in a plurality of protrusions 602 that extend into the internal passage 104. The shape 600 can result in any suitable number of protrusions 602, in the illustrated embodiment, the shape 600 results in a plurality of protrusions 602. In the illustrated embodiment, the protrusions 602 are similar, but different configurations of the protrusions 602 are envisioned, e.g., one or more of the protrusions 602 may vary.

Figure 7:
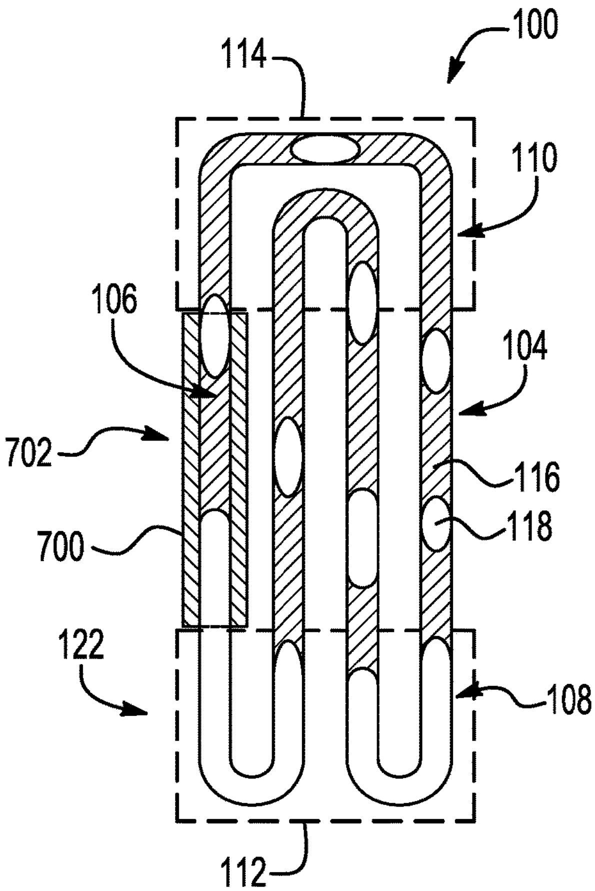
FIG. 7 is a view of another adjustable oscillating heat pipe system with a shape memory alloy component according to an embodiment of the disclosure.

As briefly mentioned above, instead of being within the internal passage 104, the SMA component 120 can be located adjacent the pipe 102 and the wall of the internal passage 104 can be formed of a flexible material that flexes in response to a shape change of the SMA component 120. Illustrated in FIG. 7 is an embodiment where an SMA component 700 is instead arranged outside of internal passage 104. Similar to the SMA component 120 described above, the SMA component 700 can be arranged at any suitable location in the OHP 100 to modify the fluid flow profile of one or more sections of the internal passage 104. In the illustrated embodiment, the SMA component 700 is arranged along a section 702 of the pipe 102 that extends between the heat sources 112 and the heat sink 114. Moreover, the SMA component 700 can be associated with any suitable amount of the pipe 102 at the section 702 of the pipe 700. In the illustrated embodiment, the SMA component 700 surrounds the entire exterior of the pipe 102, while in another embodiment the SMA component 700 may surround only a portion of the exterior of the pipe 102. The SMA component 700 can be separately attached to the pipe 102 and/or the pipe 102 may be formed (at least partially) in a plate and the SMA component 700 may be part of the plate.

Figure 8:
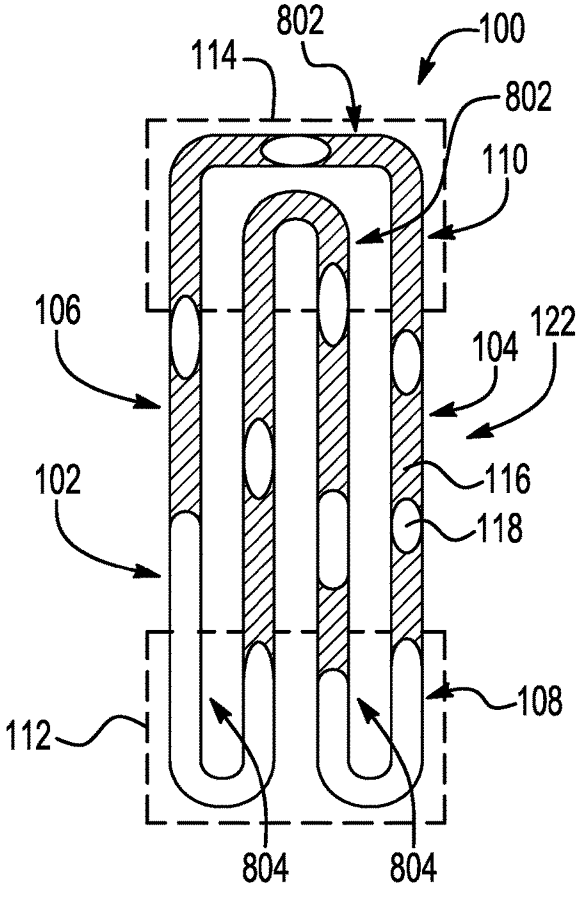
FIG. 8 is a view of a further adjustable oscillating heat pipe system with shape memory alloy components according to an embodiment of the disclosure.

As mentioned above, the OHP 100 may include a plurality of SMA components. Illustrated in FIG. 8 is an OHP 100 with a plurality of SMA components; namely, a first SMA component 800 and a second SMA component 802. The first SMA component 800 is positioned to adjust the section of the internal passage 104 at the heat sink 114 (e.g., the second portion 110 of the pipe 102) and the second SMA component 802 is positioned to adjust the section of the internal passage 104 at the heat source 112 (e.g., the first portion 108 of the pipe 102). Both the first SMA component 800 and the second SMA component 802 can be attached to the pipe 102 in a similar manner and/or the attachment method may vary. Here, the first SMA component 800 and the second SMA component 802 are located within the pipe 102, similar to the SMA component 120 described above. In another embodiment, one SMA component is attached within the pipe 102 while the other SMA component is attached to an exterior of the pipe 102. Moreover, the first SMA component 800 and the second SMA component 802 can have similar first shapes (e.g., first shape 200, FIG. 2) and similar second shapes (e.g., second shape 300, FIG. 3) and/or the shapes may vary between the two SMA components 800 and 802.

Figure 9:
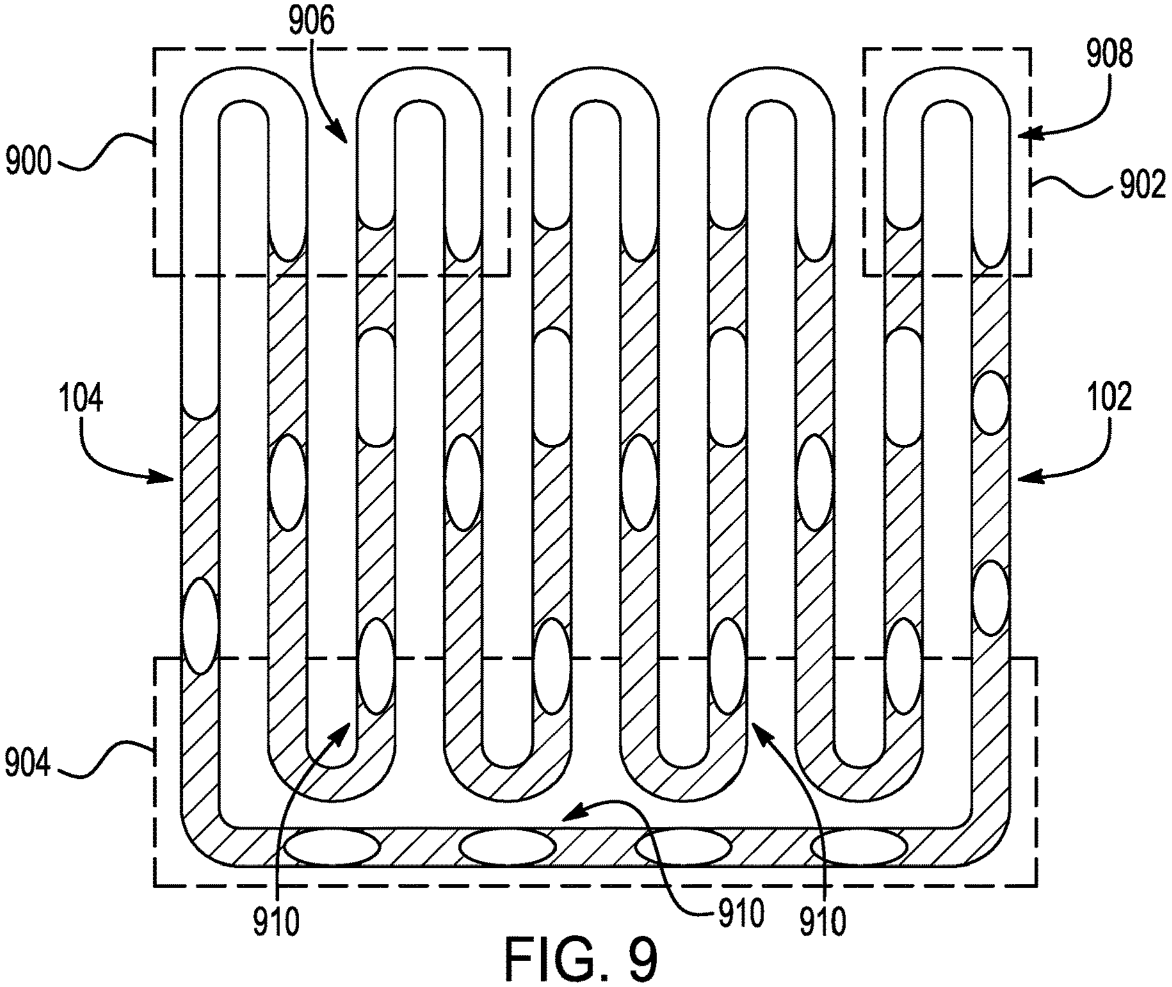
FIG. 9 is a view of yet another adjustable oscillating heat pipe system with shape memory alloy components according to an embodiment of the disclosure.

As briefly mentioned above, the OHP 100 may include a plurality of heat sources 112, heat sinks 114, and/or SMA components 120. Illustrated in FIG. 9 is an OHP 100 with a first heat source 900 and a second heat source 902 that share a similar heat sink 904. The first heat source 900, the second heat source 902, and the heat sink 904 can be in any suitable arrangement in the OHP 100, and in the illustrated embodiment, the heat sink 904 is arranged at a first end of the OHP body and the first heat source 900 is arranged along a first part of the pipe 102 and the second heat source 902 arranged along a second part of the pipe 102 spaced form the first part.

As briefly mentioned above, the OHP 100 can include any suitable number of SMA components 120 in any suitable arrangement and different arrangements can be used for different configurations of the OHP 100. For instance, in the embodiment illustrated in FIG. 9, the OHP 100 includes a first SMA component 906, a second SMA component 908, and a third SMA component 910 that are arranged at different points along the path of the internal passage 104 to control flow at different parts of the internal passage 104. The first SMA component 906 is arranged in the portion of the pipe 102 at the first heat source 900. The second SMA component 908 is arranged in the portion of the pipe 102 at the second heat source 902. The third SMA component 910 is arranged in the portion of the pipe 102 at the heat sink 904. The different SMA components can oscillate between respective first shapes and second shapes.

Similar to the description of FIG. 8 above, the first SMA component 906, the second SMA component 908, and the third SMA component 910 may be similar and/or can vary. In one embodiment, the first SMA component 906, the second SMA component 908, and the third SMA component 910 have a similar first shape while having varied second shapes. For instance, the second shape of the first SMA component 906 causes the corresponding portion of the internal passage 104 to have a converging fluid flow profile while the second shape of the second SMA component 908 causes the corresponding portion of the internal passage 104 to have a converging/diverging fluid flow profile. In another embodiment, the first SMA component 906, the second SMA component 908, and the third SMA component 910 have similar first and second shapes.

Figure 10:
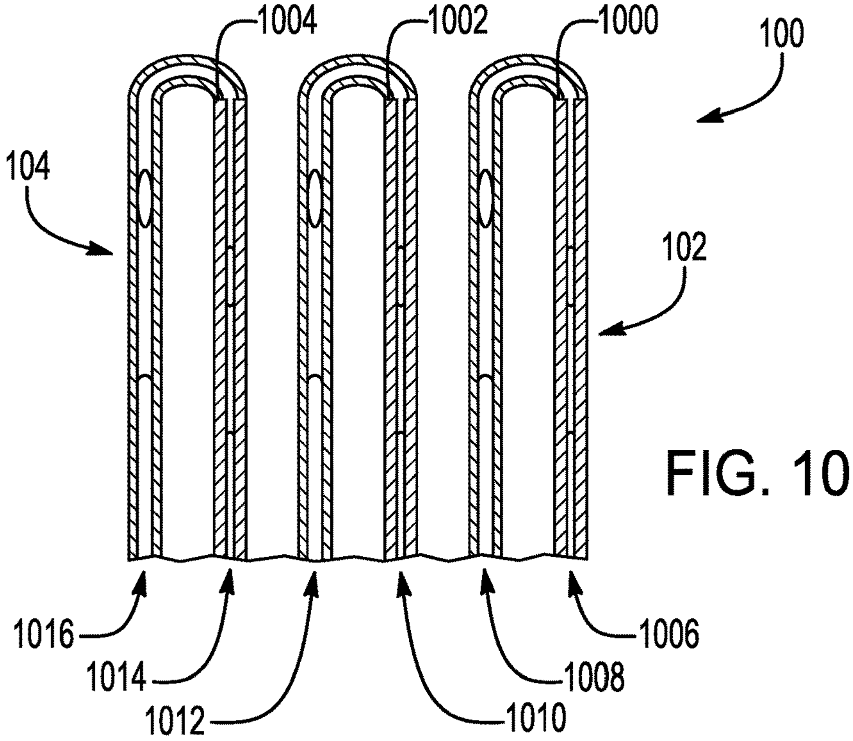
FIG. 10 is a view of a yet further adjustable oscillating heat pipe system with shape memory alloy components according to an embodiment of the disclosure.

Turning now to FIG. 10, illustrated is an OHP 100 where the SMA component is arranged to generate alternating fluid flow profiles in the internal passage 104 in the first shape and/or the second shape. In the illustrated embodiment, the OHP 100 includes separate SMA components positioned for narrowing alternating legs of the serpentine path of the pipe 102. More particularly, the OHP 100 includes a first SMA component 1000 arranged in a first leg 1006 of the pipe 102, a second SMA component 1002 arranged in a third leg 1010 of the pipe 102, and a third SMA component 1004 arranged in a fifth leg 1012 of the pipe 102 while the intervening legs (e.g., the second leg 1008, fourth leg 1011, and sixth leg 1012) do no have an SMA component or may have a different SMA component configured differently from the first, second, and third SMA components 1000, 1002, 1004.

Any suitable method may be used for manufacturing the OHP 100 prior to the SMA component 120. The SMA component 120 can then be arranged at a section of an internal passage 104 of the OHP 100, either within the internal passage 104 or an exterior of the pipe 102 according to the embodiments described above. As described above, the SMA component 120 is configured to oscillate between a first shape and a second shape and the SMA component 120 is arranged such that in the first shape the SMA component 120 causes the section of the internal passage 104 to have a first fluid flow profile and in the second shape the SMA component 120 causes the section of the internal passage 104 to have a second fluid flow profile.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An adaptable oscillating heat pipe system comprising:

an oscillating closed loop heat pipe (OHP) configured for movement of a fluid in an internal passage in the closed loop to transfer heat from a first portion of the closed loop to a second portion; and a shape memory alloy component arranged at a portion of the internal passage, wherein the shape memory alloy component is configured to oscillate between a first shape and a second shape, wherein in the first shape the shape memory alloy component causes the portion of the internal passage to have a first fluid flow profile, wherein in the second shape the shape memory alloy component causes the portion of the internal passage to have a second fluid flow profile, wherein oscillation of the shape memory alloy component is a function of temperature at the shape memory alloy component;

wherein the shape memory alloy component comprises a sleeve located in an interior of the portion of the OHP.

2. The heat pipe system of claim 1, wherein the OHP is located inside a panel, wherein the shape memory alloy component is in a portion of the panel adjacent a wall of the OHP at the portion of the OHP, wherein the wall of the OHP at the portion of the OHP is flexible.

3. The heat pipe system of claim 1, wherein the second fluid flow profile converges from a first end of the portion to a second end of the portion.

4. The heat pipe system of claim 1, wherein the second fluid flow profile is converging in a first section of the portion of the internal passage of the OHP and diverging in a second section of the portion of the internal passage of the OHP.

5. The heat pipe system of claim 1, wherein the internal passage has a first uniform cross-sectional area in the first fluid flow profile and a second uniform cross-sectional area in the second fluid flow profile.

6. The heat pipe system of claim 5, wherein the first uniform cross-sectional area is larger than the second uniform cross-sectional area.

7. The heat pipe system of claim 1, wherein the second fluid flow profile includes a plurality of protrusions that extend inwardly into the internal passage of the OHP.

8. The heat pipe system of claim 1, further comprising a second shape memory alloy component arranged at a second portion of the internal passage, wherein the second shape memory alloy component is configured to oscillate between a third shape and a fourth shape, wherein in the third shape the second shape memory alloy component causes the second portion of the internal passage to have a third fluid flow profile, wherein in the fourth shape the second shape memory alloy component causes the second portion of the internal passage to have a fourth fluid flow profile, wherein oscillation of the second shape memory alloy component is a function of temperature at the second shape memory alloy component.

9. The heat pipe system of claim 8, wherein the second fluid flow profile and the fourth fluid flow profile are different.

10. The heat pipe system of claim 8, wherein the shape memory alloy component and the second shape memory alloy component are similar.

11. The heat pipe system of claim 1, wherein the shape memory alloy component is configured to line a section of an internal wall of the portion of the internal passage.

12. An adaptable oscillating heat pipe system comprising:

a heat source;

a heat sink configured to absorb heat;

an oscillating closed loop heat pipe (OHP) with a first portion of the heat pipe arranged adjacent the heat source and a second portion of the heat pipe arranged adjacent the heat sink, wherein the heat pipe configured for movement of a fluid in an internal passage in the closed loop to transfer heat from the first portion to the second portion; and a shape memory alloy component arranged at a section of the internal passage, wherein the shape memory alloy component is configured to oscillate between a first shape and a second shape, wherein in the first shape the shape memory alloy component causes the section of the internal passage to have a first fluid flow profile, wherein in the second shape the shape memory alloy component causes the section of the internal passage to have a second fluid flow profile, wherein oscillation of the shape memory alloy component is a function of temperature at the shape memory alloy component;

wherein the shape memory alloy component comprises a sleeve located in an interior of the portion of the OHP.

13. The heat pipe system of claim 12, wherein the section of the internal passage comprises at least one of the entire first portion of the heat pipe or the entire second portion of the heat pipe.

14. The heat pipe system of claim 12, further comprising:

a second heat source, wherein the heat pipe has a third portion arranged adjacent the second heat source; and a second shape memory alloy component arranged at a second section of the internal passage adjacent between the second heat source and the heat sink, wherein the second shape memory alloy component is configured to oscillate between a third shape and a fourth shape, wherein in the third shape the second shape memory alloy component causes the second section of the internal passage to have a third fluid flow profile, wherein in the fourth shape the second shape memory alloy component causes the second section of the internal passage to have a fourth fluid flow profile, wherein oscillation of the second shape memory alloy component is a function of temperature at the second shape memory alloy component.

15. The heat pipe system of claim 14, wherein the shape memory alloy component and the second shape memory alloy component are different.

16. The heat pipe system of claim 12, further comprising:

a second heat sink configured to absorb heat, wherein the heat pipe has a third portion arranged adjacent the second heat sink; and a second shape memory alloy component arranged at a second section of the internal passage extending between the heat source and the second heat sink, wherein the second shape memory alloy component is configured to oscillate between a third shape and a fourth shape, wherein in the third shape the second shape memory alloy component causes the second section of the internal passage to have a third fluid flow profile, wherein in the fourth shape the second shape memory alloy component causes the second section of the internal passage to have a fourth fluid flow profile, wherein oscillation of the second shape memory alloy component is a function of temperature second shape memory alloy component.

* * * * *